C. W. BECK.
TIRE CARRIER FOR AUTOMOBILES.
APPLICATION FILED DEC. 19, 1910.
1,206,802.
Patented Dec. 5, 1916.
2 SHEETS—SHEET 1.
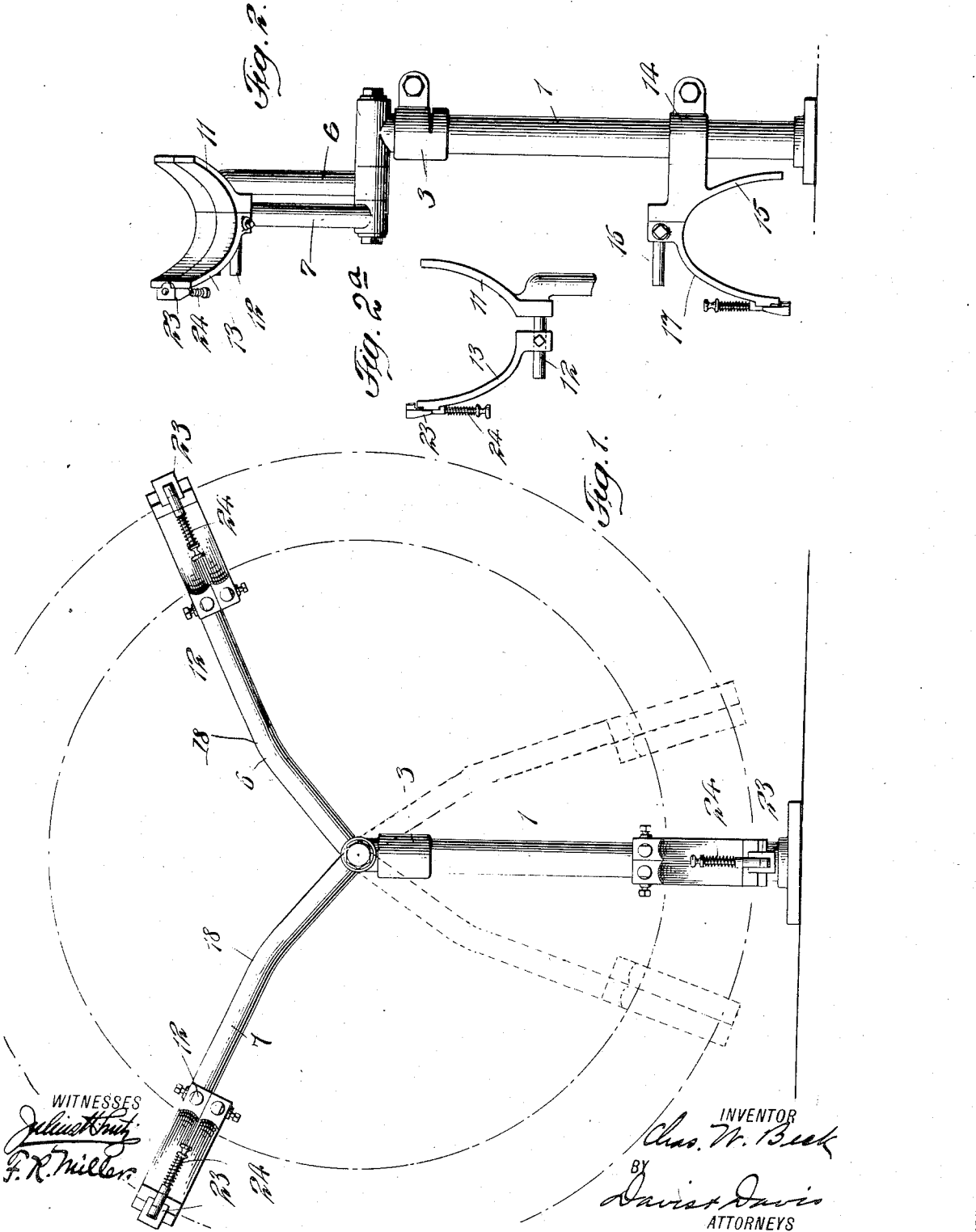

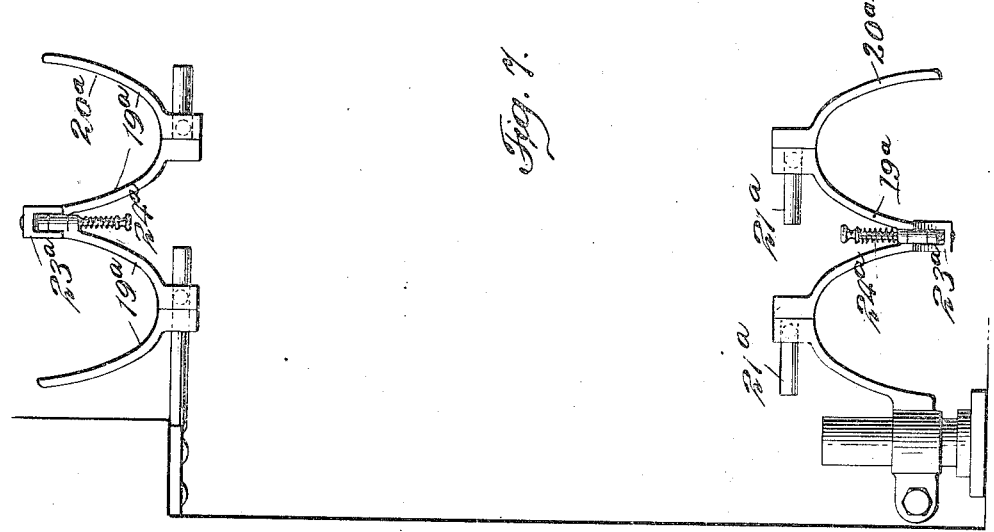
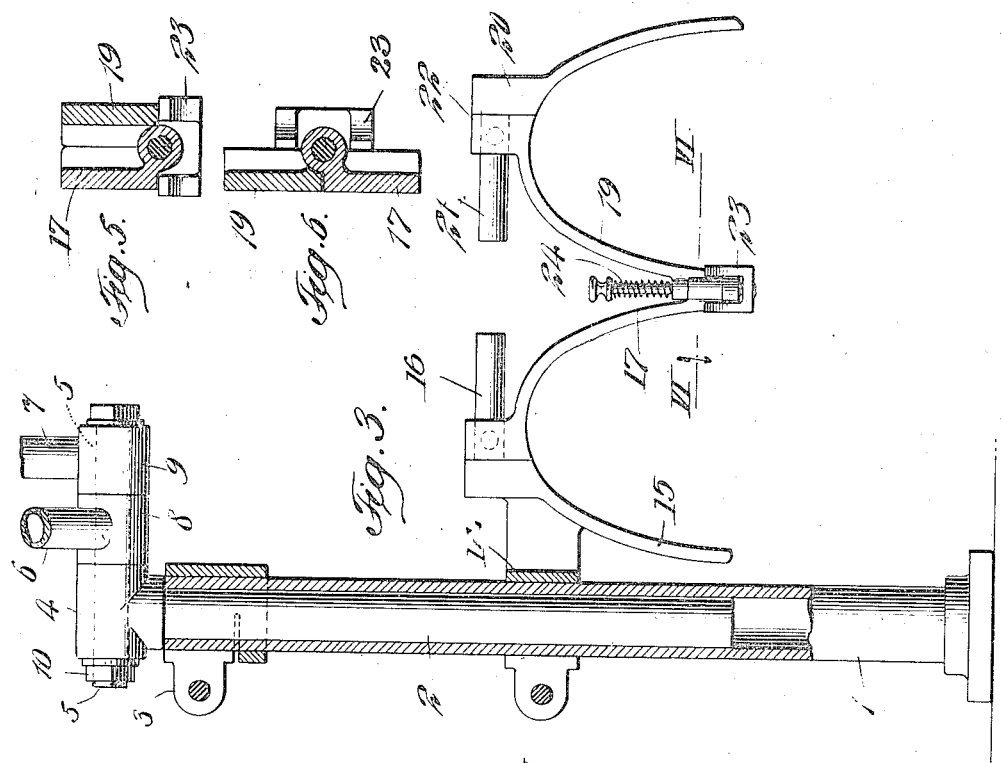

UNITED STATES PATENT OFFICE.

CHARLES W. BECK, OF ROCKVILLE CENTER, NEW YORK, ASSIGNOR, BY MESNE ASSIGNMENTS, TO THE BECK-FROST CORPORATION, OF DETROIT, MICHIGAN, A CORPORATION OF MICHIGAN.

TIRE-CARRIER FOR AUTOMOBILES.

1,206,802.  Specification of Letters Patent.  Patented Dec. 5, 1916.

Application filed December 19, 1910. Serial No. 598,160.

*To all whom it may concern:*

Be it known that I, CHARLES W. BECK, a citizen of the United States, and resident of Rockville Center, county of Nassau, and State of New York, have invented certain new and useful Improvements in Tire-Carriers for Automobiles, of which the following is a specification.

One of the important objects of this invention is to provide a foldable tire carrier for use on automobiles, whereby the device may be folded to occupy small space when not in use.

Another important object of the invention is to provide a tire carrier which may be expanded laterally to increase its capacity. As shown in the drawings, it may be arranged to hold one tire, or it may be extended laterally to be adapted to hold two tires arranged side by side.

A further object of the invention is to provide a carrier of very simple construction which may be adapted to receive tires of various sizes; and which is simple and cheap in construction and yet very strong and durable.

In the drawings: Figure 1 is a side elevation of the carrier arranged to support one tire; Fig. 2 an end elevation thereof, the parts being arranged as shown in Fig. 1; Fig. 2ª a detail view of one of the holding yokes; Fig. 3 a vertical sectional view of the supporting posts the tire receiving device on said posts being extended laterally to adapt the carrier to receive two tires; Fig. 4 a detail vertical sectional view of the lock for securing the tire holding yokes in their folded positions; Fig. 5 a horizontal sectional view on the line V—V of Fig. 4; Fig. 6 a horizontal sectional view on the line VI—VI of Fig. 3; and Fig. 7 a detail end elevation of a slightly different means for supporting the foldable tire holding yokes.

Referring to the various parts by numerals, 1 designates a suitable standard which may be rigidly secured to the running board of an automobile by any suitable fastening means. This standard is preferably tubular and receives a vertically slidable post 2. The upper end of the standard is preferably split and to it is secured a split clamping sleeve 3 so that the post 2 may be securely clamped therein at any desired height. The post 2 is rotatable within the standard, and of course may be held against rotation by means of the clamping sleeve 3. To the upper end of the post 2 is secured the head 4 said head carrying a rigid horizontal bar 5 which projects beyond the head and forms a support for a pair of foldable arms 6 and 7. These arms are formed at their inner ends with sleeves 8 and 9 which fit over the bar 5 and are suitably clamped thereon by a nut 10, or by any other suitable means.

Each of the arms 6 and 7 is provided at its outer end with a rigid outwardly extending yoke member 11, and with a horizontally extending rigid bar 12. Adjustable on said bar is a relatively movable member 13, the two members 11 and 13 constituting in their normal operative positions an approximately semi-circular tire holding yoke. The member 13 is adjustable relatively to the member 11, and on the bar 12, for the purpose of adapting the tire yoke for the reception of tires of different cross sectional area.

The arms 6 and 7 are so clamped on the bearing bar 5 that they will frictionally engage said bar and each other sufficiently to hold them in their proper positions when they are arranged to support a tire, as shown in Fig. 1 of the drawings.

On the standard 1 is arranged a vertically adjustable sleeve 14 which is formed with a rigid downwardly extending member 15 of a tire receiving yoke. The sleeve 14 also carries the outwardly extending bar 16, on which is arranged a relatively movable member 17 of the carrier receiving yoke. When the arms 6 and 7 are arranged in their proper operative positions a tire may be placed on their holding yokes and then the sleeve 14 lowered on the standard 1 until its tire receiving yoke also engages the tire. The tire will then be held firmly at three points equal distances from each other, as illustrated clearly in Fig. 1. The post 2 may be vertically adjusted within the standard for the purpose of adapting the carrier for tires of different diameters. When the arms 6 and 7 are not in use they may be folded down to the sides of the standard, each of said arms being bent as shown at 18 to bring the tire-receiving yokes close to the standard when the arms are in their folded positions.

To provide means for increasing the capacity of the carrier so that the same may be adapted to hold two tires, the movable member of each of the yokes just described carries a hinged or swinging yoke which may be swung outwardly to a position in the same plane with the yoke directly supported. As all of these swinging yokes are identical in construction it will only be necessary to describe one of them, it being understood that the description may be applied to all of said swinging yokes. To the outer end of the adjustable member of the yoke is hinged one member 19 of the swinging yoke. This member 19 carries a relatively adjustable member 20 of said swinging yoke, this latter member being provided with a bar 21 which is adjustable in a lug 22 on the member 19. By this arrangement the members of the swinging yoke may be adjusted to correspond exactly with the members of the non-swinging yoke. When the swinging yoke is in its inner or folded position it lies in contact, and parallel, with the main or non-swinging yoke, as illustrated clearly in Figs. 1 and 2 of the drawings. When it is in its outer or unfolded position it lies in the same plane with the non-swinging yoke and is in position to hold a tire parallel with the tire held by the main or non-swinging yoke, as clearly shown in Fig. 3 of the drawings.

To lock the swinging yoke in its inner or folded position and in its outer or unfolded position, a locking cam 23 is provided. This locking cam is mounted on the hinge-pin and is held in its operative position by means of the spring 24 surrounding the projecting end of said pin and serving to draw the locking cam inwardly to engage the ends of the hinged members of the carrying yokes. This cam is formed with two arms which are arranged to engage the hinged members of the yokes on opposite sides of the hinge or pivot and to hold them in their closed position, as shown clearly in Fig. 5; and also to hold them in their open positions as illustrated clearly in Figs. 3 and 6. When it is desired to release the hinged members of the yokes the hinge-pin is moved longitudinally against the tension of the spring 24 until the ends of the cam arms 23 are released from the ends of the yoke members. Said members will then be free to be swung about the hinge-pin. When it is desired to lock the yokes the hinge-pin is released and the two arms of the cam 23 again engage the ends of the yoke members and lock them either in their folded or unfolded positions.

It will of course be understood that this locking device may be of any suitable form and I desire it understood that I am not to be limited to any particular form of locking device except as the same may be made the subject matter of claims herein.

In Fig. 7 the supporting standard and post are dispensed with, the carrying yokes being supported from adjacent portions of the automobile. It will be understood of course that the carrying yokes may be employed independently of the adjustable post and standard, and independently of the swinging arms carried by the vertically adjustable post. In this view $19^a$ designates the hinged member of the swinging yoke; $20^a$ the adjustable member thereof; $21^a$ the bar which may be carried by either the hinged member $19^a$ or the adjustable member $30^a$. $23^a$ designates the locking cam and $24^a$ the spring for holding said cam in its locked position.

It is clear that by arranging the two arm locking cam so that the arms thereof will tightly engage the hinged members of the yokes on opposite sides of the hinge, said cam will prevent any swinging movement of the hinged members. As shown in Figs. 1 and 5 said cam arms engage the broad outer sides of the hinged members to hold and lock said members in their folded position. In Figs. 3 and 6 said cam arms are shown as engaging the edges of the hinged members, thereby locking the tire yokes in their unfolded or separated position.

It will thus be seen that the carrier is adapted to receive and support tires of various sizes; that it may be expanded laterally to adapt it to receive two tires, and that when not in use it may be folded to reduce its height and width so that it will occupy a very small space.

Having thus fully described my invention what I claim as new and desire to secure by Letters Patent is:

1. A tire carrier comprising a support, a holding yoke connected thereto and formed of two receiving members arranged side by side and hinged together at the adjoining ends of contacting yoke arms, whereby said members may be brought together to form one open yoke or swung outwardly away from each other to form two open yokes, a two-arm locking cam carried by said members at the pivotal point thereof and arranged to engage said members on opposite sides of the pivotal point both when said members are arranged to form a one-tire carrier and when they are arranged to form a two-tire carrier.

2. A tire carrier comprising a support, a holding yoke connected thereto and formed of two receiving members arranged side by side and hinged together at the adjoining ends of contacting yoke arms, whereby said members may be brought together to form one open yoke or swung outwardly away from each other to form two open yokes, a two-arm locking cam carried by said members at the pivotal point thereof and arranged to engage said members on opposite sides of the pivotal point both when said members are arranged to form a one-tire carrier and when they are arranged to form a two-tire carrier, and a spring to hold said cam in its locking position.

3. A tire carrier comprising a support, a holding yoke connected thereto and formed of two receiving members arranged side by side and hinged together at the adjoining ends of contacting yoke arms, whereby said members may be brought together to form one open yoke or swung outwardly away from each other to form two open yokes, a two-arm locking cam carried by the pivot of said members, said pivot being longitudinally movable to free the cam from said members, and a spring surrounding said pivot and acting to hold the cam in its locking position, said cam being arranged to engage the members on opposite sides of the pivot, both when said members are arranged as a one-tire carrier and when they are arranged as a two-tire carrier.

4. A tire carrier comprising a support, a holding yoke connected thereto and formed of two receiving members arranged side by side and hinged together at the adjoining ends of contacting yoke arms, whereby said members may be brought together to form one open yoke or swung outwardly away from each other to form two open yokes, each of said yokes being formed of two parts adjustable toward and from each other to adapt said yokes to receive tires of different diameters.

5. A tire carrier comprising a standard, an inverted yoke vertically adjustable on the said standard and adapted to fit down over the inner side of a tire, two radially arranged tire carrying arms pivoted to the upper end of the standard and adapted to swing upwardly in opposite directions, a tire holding yoke secured to the outer end of each of said arms, said yokes being adapted to engage the inner side of the tire and to support it on opposite sides of the standard and to extend partially around it, whereby the tire may be dropped into the yokes carried by the swinging arms and the yoke carried by the standard then lowered to lock the tire in place.

6. A tire carrier comprising a standard, an inverted yoke vertically adjustable on the said standard and adapted to fit down over the inner side of a tire, two radially arranged tire carrying arms pivoted to the upper end of the standard and adapted to swing upwardly in opposite directions, a tire holding yoke secured to the outer end of each of said arms, said yokes being adapted to engage the inner side of the tire and to support it on opposite sides of the standard and to extend partially around it, whereby the tire may be dropped into the yokes carried by the swinging arms and the yoke carried by the standard then lowered to lock the tire in place, each of said yokes being formed of two parts adjustable toward and from each other to adapt said yokes to receive tires of different diameters.

7. A tire carrier comprising a support, a holding yoke connected thereto and formed of two receiving members arranged side by side in parallel planes and hinged together at the adjoining ends of contacting yoke arms, whereby said members may be brought together side by side to form one broad open yoke or swung outwardly away from each other to form two open yokes lying in substantially the same plane, and means for locking said yokes in their extended position.

8. A tire carrier comprising a standard, an inverted yoke vertically adjustable on the said standard and adapted to fit down over the inner side of the tire, two radially arranged tire carrying arms pivoted to the upper end of the standard and adapted to swing upwardly in opposite directions, a tire holding yoke secured to the outer end of each of said arms, said yokes being adapted to engage the inner side of the tire and to support it on opposite sides of the standard and to extend partially around it, each of the yokes carried by the swinging arms and the yoke carried by the standard being formed of two receiving members arranged side by side in parallel planes and hinged together at the adjoining ends of contacting yoke arms, whereby said members may be brought together side by side in parallel planes to form one open yoke or swung outwardly away from each other into substantially the same plane to form two yokes.

9. A tire carrier comprising a support, a holding yoke connected thereto and formed of two complete receiving yokes arranged side by side in parallel planes and hinged together at the adjoining outer ends of two contacting yoke arms, whereby said yokes may be brought together side by side to form one broad double open yoke or swung outwardly away from each other to form two single open yokes lying in substantially the same plane.

10. A tire carrier comprising a support, a holding yoke connected thereto and formed of two complete receiving yokes arranged side by side in parallel planes and hinged together at the adjoining outer ends of two contacting yoke arms, whereby said yokes may be brought together side by side to form one broad double open yoke or swung outwardly away from each other to form two single open yokes lying in substantially the same plane, and means for holding said yokes in their open or extended positions.

11. In a tire carrier, the combination of a plurality of independent tire-supporting bearings adapted to be arranged side by side for supporting a plurality of tires, and a mounting for one of said bearings permitting said bearing to be brought into substantial alinement with another of said bearings in the direction of the longitudinal circumference of the tire.

12. In a tire carrier, the combination of a support, a tire-supporting member fixedly mounted upon the support and a second tire-supporting member hinged to the first-mentioned member, said hinged connection permitting said members to be extended for supporting different tires or to be folded into substantial alinement in the direction of the longitudinal circumference of the tire.

13. In a tire carrier, a plurality of sets of independent tire-supporting bearings, means for supporting the bearings of one of said sets in fixed relation to each other, and means for supporting the bearings of the other set in substantial parallel relation to the bearings of the first-mentioned set or in substantial alinement therewith in the direction of the longitudinal circumference of the tire.

14. In a tire carrier, a plurality of tire-supporting bearings, a support to which one of said bearings is fixedly secured, and means for supporting another bearing permitting it to be extended for supporting a different tire from the first-mentioned bearing or to be brought into alinement with the first-mentioned bearing in the direction of the longitudinal circumference of the tire to support the tire.

15. A tire carrier comprising a support, a holding yoke connected thereto and formed of two complete receiving yokes arranged side by side, and a mounting for one of said yokes permitting said yoke to be brought in circumferential alinement with the other yoke to form one broad double yoke or to be swung outwardly away from the last-mentioned yoke to form two single yokes for supporting different tires.

In testimony whereof I hereunto affix my signature in the presence of two witnesses this 17th day of December, 1910.

CHARLES W. BECK.

Witnesses:
  WM. R. DAVIS,
  F. R. MILLER.